Oct. 6, 1970   R. T. JOHNSON ETAL   3,532,785
METHOD FOR PUNCHING AN OPENING IN A SYNTHETIC PLASTIC
CONTAINER SECTION BLANK AND FORMING RIBS THEREON
Filed Oct. 13, 1967   6 Sheets-Sheet 1
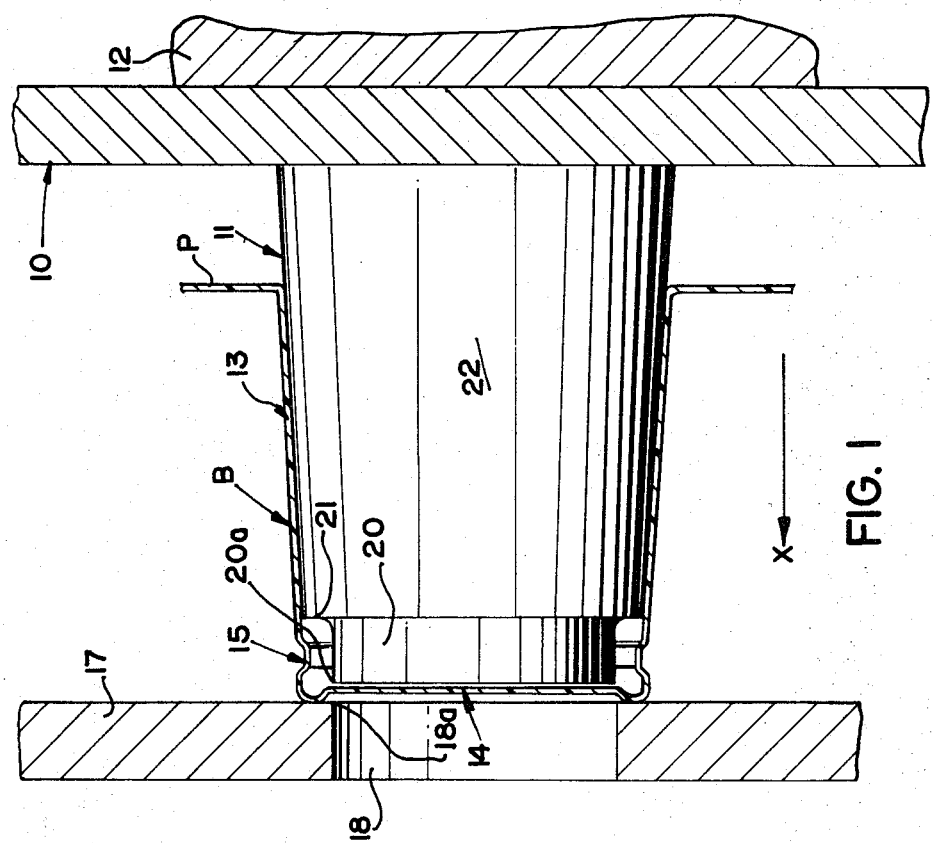
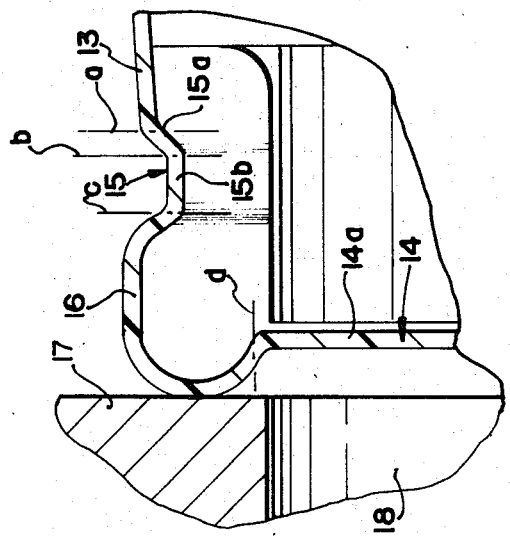
INVENTORS
ROBERT T. JOHNSON
LARRY BRUSHABER
BY Oct. 6, 1970 R. T. JOHNSON ETAL 3,532,785
METHOD FOR PUNCHING AN OPENING IN A SYNTHETIC PLASTIC
CONTAINER SECTION BLANK AND FORMING RIBS THEREON
Filed Oct. 13, 1967 6 Sheets-Sheet 2
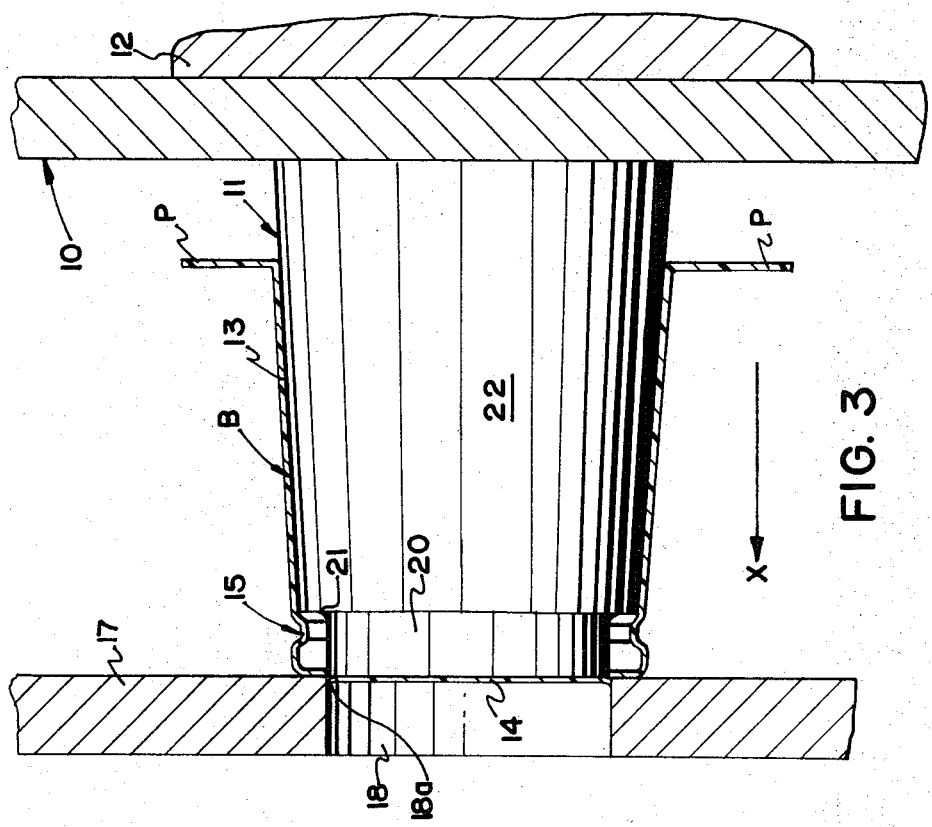
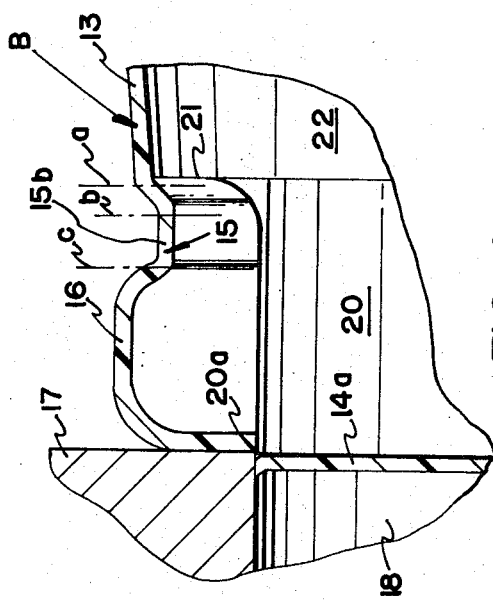
INVENTORS
ROBERT T. JOHNSON
LARRY BRUSHABER
BY

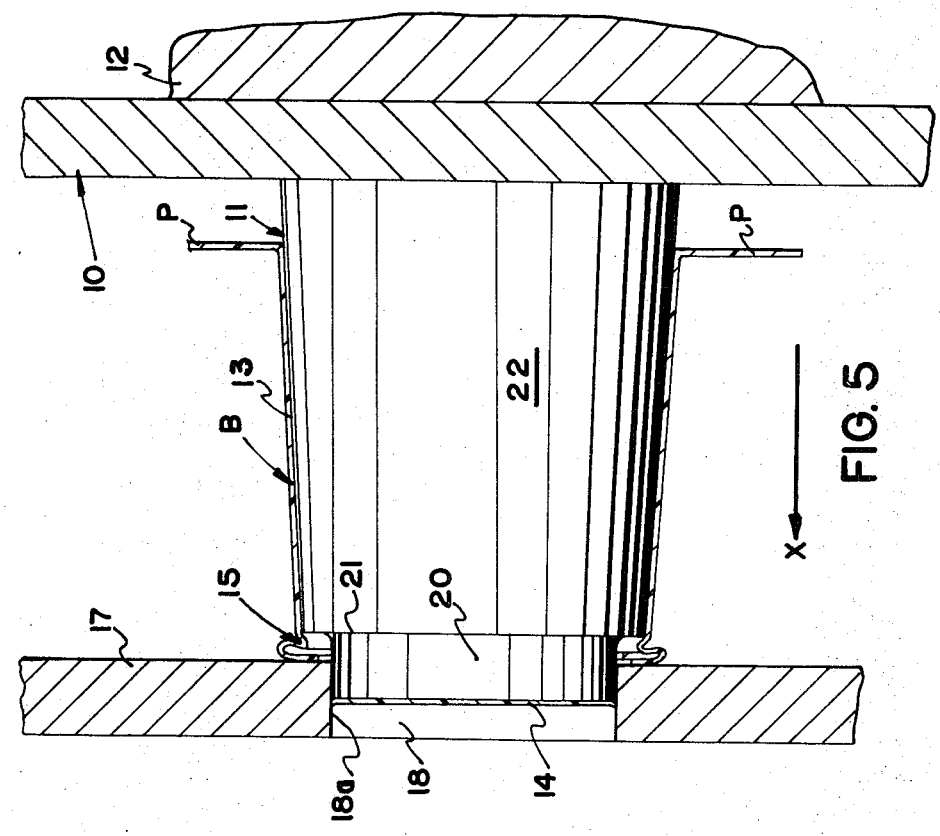
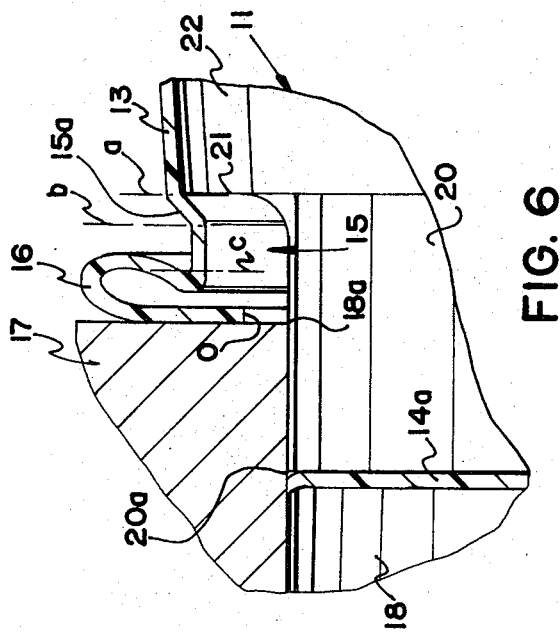
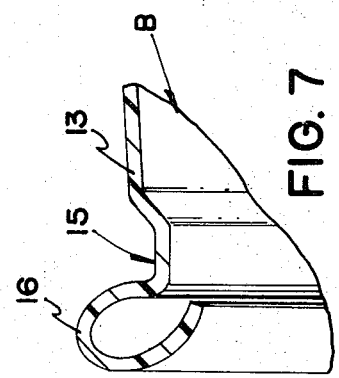

Oct. 6, 1970   R. T. JOHNSON ETAL   3,532,785
METHOD FOR PUNCHING AN OPENING IN A SYNTHETIC PLASTIC
CONTAINER SECTION BLANK AND FORMING RIBS THEREON
Filed Oct. 13, 1967   6 Sheets-Sheet 4
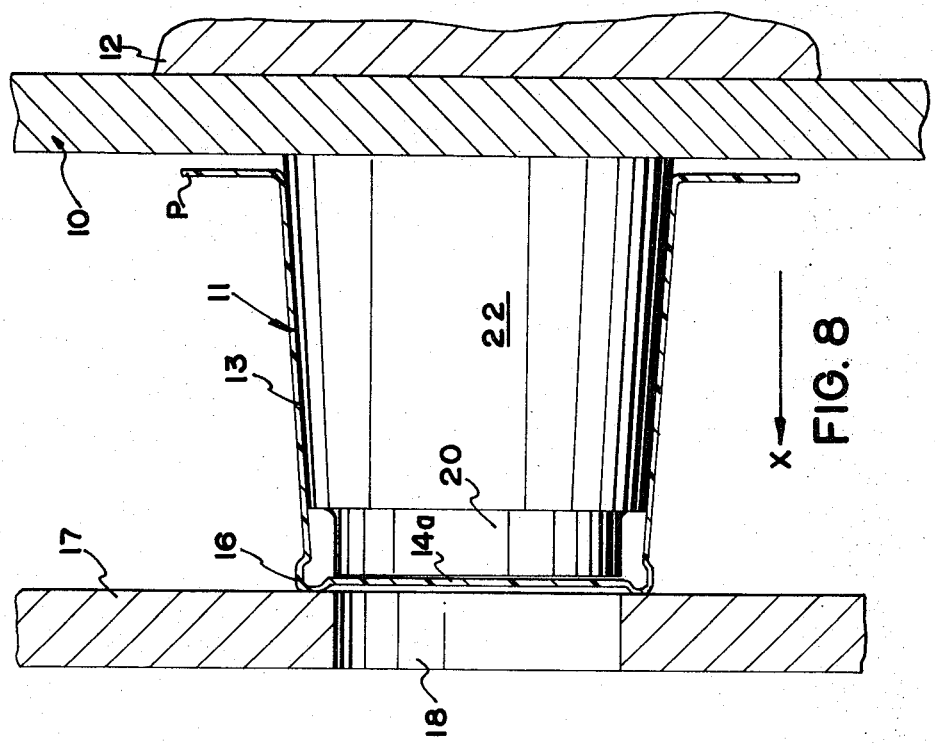
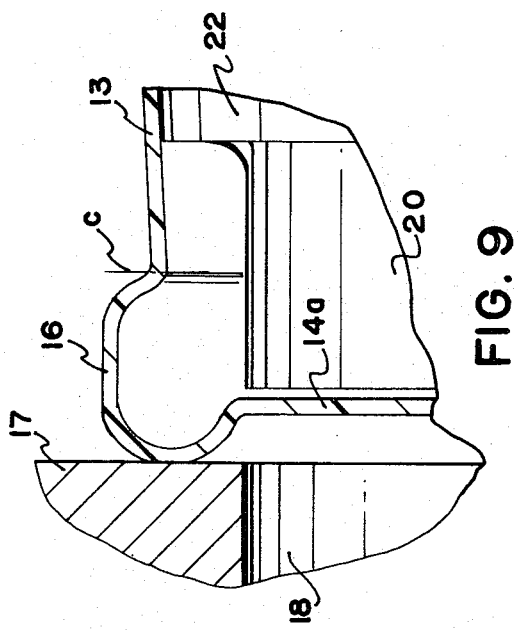
INVENTORS
ROBERT T. JOHNSON
LARRY BRUSHABER
BY

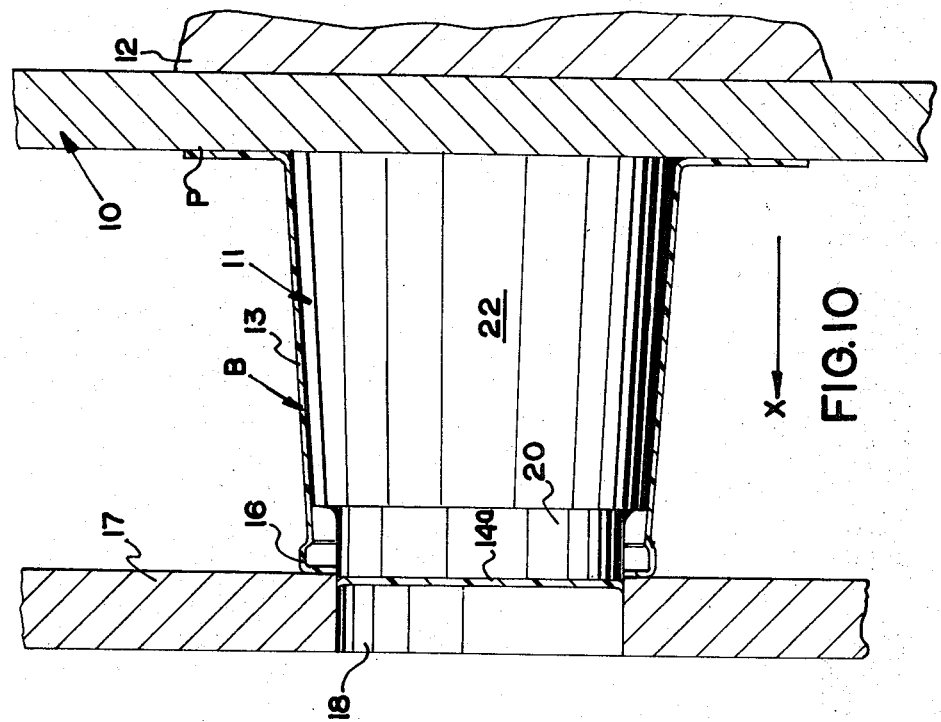
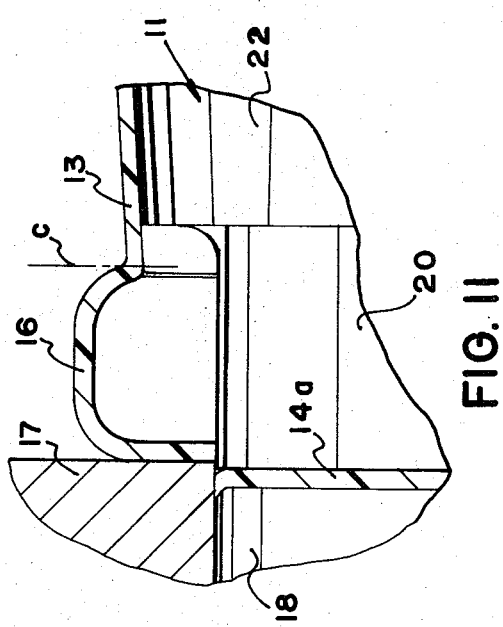

INVENTORS
ROBERT T JOHNSON
LARRY BRUSHABER
BY

3,532,785
METHOD FOR PUNCHING AN OPENING IN A SYNTHETIC PLASTIC CONTAINER SECTION BLANK AND FORMING RIBS THEREON

Robert T. Johnson and Larry Brushaber, Beaverton, Mich., assignors to Brown Machine Company of Michigan, Inc., Beaverton, Mich., a corporation of Michigan
Filed Oct. 13, 1967, Ser. No. 675,127
Int. Cl. B29d *23/10;* B29c *17/02*
U.S. Cl. 264—155                    6 Claims

ABSTRACT OF THE DISCLOSURE

A method for punching an opening in a synthetic plastic container section blank of predetermined configuration and substantially simultaneously essentially cold forming a rim on the punched edge of the section blank wherein the container blanks have predetermined fold edges permitting their deformation to form the desired rims when an axial pressure is applied to the container.

---

This invention relates to methods for punching an end opening in plastic container section blanks and substantially simultaneously forming curvilinear return rims on the edge of the section punched, and is also directed to the container blank, which is configured to permit a predetermined forming operation to take place.

Presently the exterior rims of plastic containers are curled by rim curling machinery disposed in a production line downstream from a trim press for punching out the containers from the plastic web in which they are formed in rows at high rates of speed. One of the prime objects of the present invention is to provide a method which may be accomplished in a trim press for substantially simultaneously punching an opening in a container section and at the same time curling its rim to thus obviate the necessity for separate rim curling machinery.

A further object of the invention is to design a method for using apparatus of the character described which is capable of operating at the high production rates of conventional differential pressure thermoforming and trim press machinery.

A further object of the invention is to provide a method of the character mentioned which achieves the formation of a rim end portion of considerably greater diameter than the adjacent side wall of the container section without the necessity of utilizing a split mold to differentially pressure form the container section blank in the first place.

Another object of the invention is to provide a highly efficient, simple and economic method of forming interior rims on synthetic plastic container section blanks.

Other objects and advantages of the invention will be pointed out specifically or will become apparent from the following description when it is considered in conjunction with the appended claims and the accompanying drawings, in which:

FIG. 1 is a fragmentary, sectional elevational view showing the container forming and punch-out parts in somewhat removed position prior to engagement of the reciprocating punch member with the end wall of the container section blank in which the opening is to be punched;

FIG. 2 is a greatly enlarged, fragmentary, sectional elevational view showing the container section blank end as it is initially differential pressure formed with a contour suitable for the operation to be performed;

FIG. 3 is a view similar to FIG. 1, with the punch shown moved toward the stationary die to a position in which it has just punched the opening in the end of the container section blank;

FIG. 4 is a greatly enlarged view similar to FIG. 2 showing a portion of the punch and end of the container section blank;

FIG. 5 is a sectional side elevational view similar to FIGS. 1 and 3 showing the punch in its most advanced position;

FIG. 6 is a greatly enlarged view similar to FIGS. 2 and 4 and illustrating the deformed condition of the container blank end at this stage of the operation;

FIG. 7 is a view similar to FIGS. 2, 4 and 6 showing the end of the container section blank after it has been released to permit its rim portion to return partially due to its inherent resilient nature;

FIG. 8 is a fragmentary sectional elevational view similar to FIG. 1 showing a modified container punch-out and forming device in removed position prior to engagement of the punch with the end wall of the container section blank in which the opening is to be punched;

FIG. 9 is a greatly enlarged, fragmentary sectional elevational view illustrating a container section end of different configuration as it is initially formed with a different configuration also suitable for the operation to be performed;

FIG. 10 is a view similar to FIG. 8 with the punch shown moved toward the stationary die to a position in which it has just punched the opening in the end of the container section blank;

FIG. 11 is an enlarged, fragmentary view similar to FIG. 9 showing a portion of the punch and end of container section blank;

Figure 12:
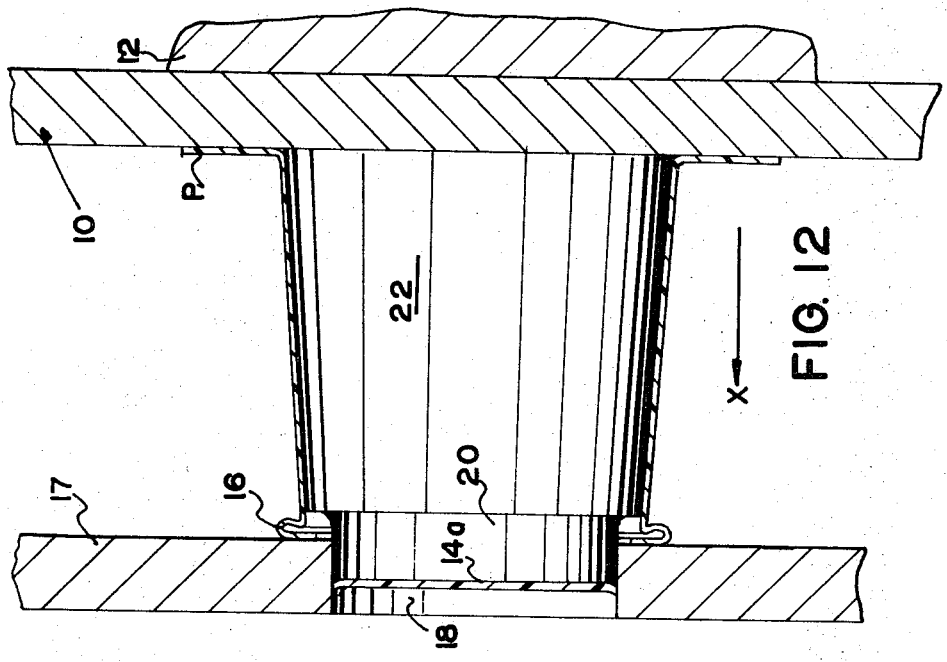
FIG. 12 is a sectional side elevational view similar to FIGS. 8 and 10 and showing the punch in its most advanced position.

Referring now more particularly to the accompanying drawings, and in the first instance to FIGS. 1-7 thereof, wherein one form of apparatus for performing the invention is disclosed, a numeral 10 generally designates the reciprocable platen of the trim press in which the operation is to be performed and which may be of the type illustrated in U.S. Pat. No. 3,297,504 wherein a punch-out operation is being performed. The platen 10, which is provided with projecting punch and forming members generally designated 11, is mounted on a reciprocating connecting rod member 12 and, as in the patent mentioned, is reciprocated in timed relation with the down feed of a plastic web generally indicated P in indexing movements. The plastic web P is fed downwardly by conventional mechanism of the type disclosed, for instance, in Martin U.S. Pat. No. 3,217,576, which also discloses drive shaft shaft means for reciprocating such a connecting rod in timed relation therewith, and is a portion of a web or sheet proceeding from a differential pressure forming machine which has vertically spaced, horizontal rows of container section blanks generally designated B formed therein in the usual manner. The plastic web may be a high impact polystyrene plastic or may be other known types of plastics such as polyethylene and polypropylene. As in the Brown et al., U.S. Pat. No. 3,297,504 mentioned, the punching operation may be accomplished in one stage in the trim press and the container sections severed from the web P in another stage of the process by tubular punches located immediately below the punches 11 shown. The patents mentioned are incorporated by reference herein to the extent that they are desirable for disclosing the related apparatus.

As FIGS. 1 and 2 particularly indicate, each container section blank B formed in the plastic web P initially comprises a cylindrical side wall generally designated 13 and a closed end wall generally designated 14. The side wall 13 is formed with an inwardly extending bulge or inset stiffening rib generally designated 15 which has a wall portion 15a between edges a and b and a wall portion 15b between edges b and c. The side wall 13 and end wall 14 also include a generally curvilinear, somewhat channel-shaped connecting wall portion 16 between edges c and d. The wall portion 16 constitutes what may be termed a fold section and the edge c a fold edge, as will later be seen.

The reciprocable platen 10 is shown in FIG. 1 moving in the direction of the arrow x toward a stationary platen 17 having openings 18 of predetermined diameter provided therein. The punch members 11, which are preferably fixed in a horizontal row on the moving platen 10, include reduced diameter end sections 20 which extend from an annular shoulder 21 on frustoconical body portion 22. The diameter of each portion 20 is such that it has only a sliding clearance relative to each opening 18, as will be apparent from FIGS. 3 and 5 which show the punch portion 20 severing end wall portion 14a from the bottom wall 14 of the container section blank to form an opening O in the blank B. The edge 20a of each punch portion 20 and the leading edge 18a of each opening 18 are relatively sharp edges to facilitate the punch-out operation.

In operation, the movable platen 10 is moved at a rapid speed toward the stationary platen 17 and, as FIG. 3 indicates, the edge 20a of each punch member 11 first engages and punches out the section 14a which in FIGS. 3 and 4 is shown separated from the container blank B. Substantially immediately thereafter the shoulder 21 engages the inwardly beveled portion 15a of the plastic side wall 13, as shown particularly in FIG. 4, and as the punch member 11 continues to move from right to left bears on the surface 15a to force the end portion of the container section against the stationary platen 17 as shown particularly in FIGS. 5 and 6. Because the bulge portion 15 functions as a reinforcing rib, the fold section 16 is compressed and swung outwardly about the edge c once the portion 14a is severed as FIG. 6 demonstrates.

FIG. 6 demonstrates the extent of the forward stroke of the punch 11 which, when withdrawn, permits a certain partial return of the resilient plastic wall portions. In final form, then, the container section appears as in FIG. 7 with the portion 16 defining what amounts to an inwardly facing, generally curvilinear rim, the rim 16 being of considerably increased diameter with respect to the side wall 13 at the edge a. In the next step in the operation, as demonstrated in the Brown et al. patent mentioned, the plastic web P is indexed downwardly and the container sections B are punched from the plastic web P. Later, the sections so formed, which comprise the top sections of a container, are friction welded to container lower sections to provide a complete container, and thereafter the container is filled and a suitable cap or closure is engaged with the terminal edge of the rim 16 to close the dispensing opening O which was punched therein.

In FIGS. 8–14 we have shown another embodiment of the invention in which a slightly different container section blank is processed by slightly modified punching and rim forming apparatus. As FIG. 8 indicates, the inset bulge or rib portion 15 on the side wall 13 is eliminated because, as FIG. 10 indicates, the punching pressure is supplied when the platen 10 engages the plastic web P sooner and is not dependent on the shoulder 21 engaging a rib surface 15a.

Figure 13:
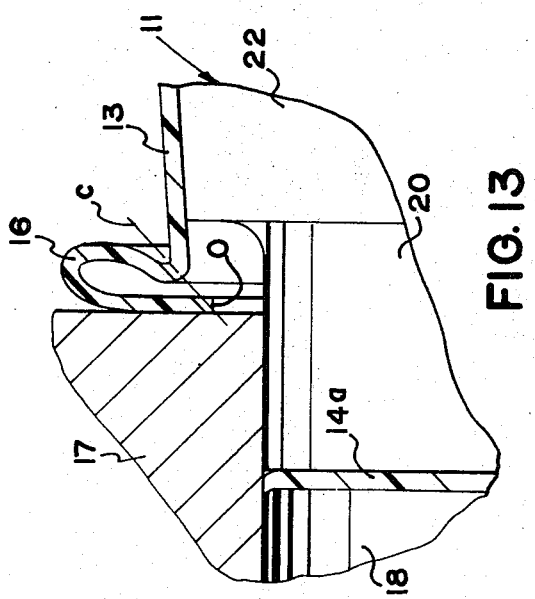
FIG. 13 is a greatly enlarged view similar to FIGS. 9 and 11 and illustrating the deformed condition of the container blank end at this stage of the operation.
Figure 14:
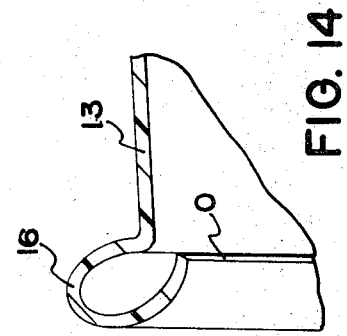
FIG. 14 is a view similar to FIGS. 9, 11 and 13 showing the end of the container section blank after it has been released.

In the operation of the mechanism illustrated in FIGS. 8–14, with the punch 11 moving from right to left in the direction x as previously, the section 14a is first punched from the container section blank end wall 14 after the moving platen 10 engages the plastic web P, as shown in FIGS. 10 and 11, and thereafter the fold portion 16 is compressed against the stationary platen member 17, as shown in FIGS. 12 and 13. As FIGS. 12 and 13 indicate, the fold portion 16 is swung outwardly essentially about the edge c in the same manner as previously. When the moving platen 10 is withdrawn, the container section blank B returns somewhat, to the shape shown in FIG. 14, the rim portion formed now having a considerably greater external diameter than did the section 16 prior to forming.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. A method of essentially cold forming a rim portion of generally C-shaped cross section on a synthetic plastic container portion having a side wall portion and a generally laterally inwardly extending end wall portion and wherein the side wall portion and end portion are provided with portions which together define a perimetral fold section having an initial maximum diameter and intended to form the rim portion comprising: punching an opening of less diameter than the diameter of said container end portion in said container end portion; axially over-compressing the portions of the side wall portion and end portion defining the fold section while maintaining the fold section in its normal condition of resilience to cause the fold section to be axially compressed and radially enlarged beyond said maximum diameter to a predetermined degree and to cause a predetermined permanent deformation in the resilient material; and releasing said fold section to permit the partial return of the deformed fold section to the rim configuration.

2. The method defined in claim 1 wherein said side wall portion includes a radially inwardly extending bulge spaced from said end portion, and the axial compression is applied such as to cause the portions forming the fold section to pivot radially outwardly from the bulge portion to an extent such that upon release of the axial pressure the rim portion formed has a greater external diameter than said initial maximum diameter of said fold section.

3. The method as set forth in claim 1 wherein a punching tool is moved in a path of movement relatively to the container portion and an opposing compressing surface with an opening therein, to receive said tool to first accomplish said punching step when the tool is received in the opening, and then accomplish said over-compressing step.

4. The method as set forth in claim 3 wherein said side wall portion includes a radially inwardly extending bulge spaced from said end portion, and said over-compressing step is accomplished by engaging said bulge with said tool, after said tool has punched said opening and as said tool continues to move to force said end portion against said compressing surface.

5. The method as set forth in claim 3 wherein said over-compressing step is accomplished by said tool engaging the end of said container portion opposite said end portion, after said tool has punched said opening, to exert an axial compressing force.

6. The method set forth in claim 1 wherein said container end portion includes a radially extending outer ring portion and a central portion connected thereto by a portion inclined in an axial return direction, and it is substantially said central portion which is punched out.

References Cited

UNITED STATES PATENTS

| | | | |
|---|---|---|---|
| 2,347,101 | 4/1944 | Harding | 264—339 |
| 2,712,157 | 7/1955 | Holte | 264—187 XR |
| 3,339,004 | 8/1967 | Nardone | 264—320 XR |
| 3,342,915 | 9/1967 | Wanderer | 264—322 XR |
| 3,370,118 | 2/1968 | Lowe | 264—294 XR |
| 3,418,690 | 12/1968 | Edwards | 18—19 |
| 3,375,551 | 4/1968 | Sherlock | 264—296 XR |
| 3,453,359 | 7/1969 | Clement | 264—296 XR |

ROBERT F. WHITE, Primary Examiner

R. R. KUCIA, Assistant Examiner

U.S. Cl. X.R.

264—163, 296